Aug. 6, 1946.  D. C. KEMPTHORN  2,405,149
HOLLOW RUBBER ARTICLE AND APPARATUS FOR PRODUCING SAME
Original Filed July 15, 1942  2 Sheets-Sheet 1
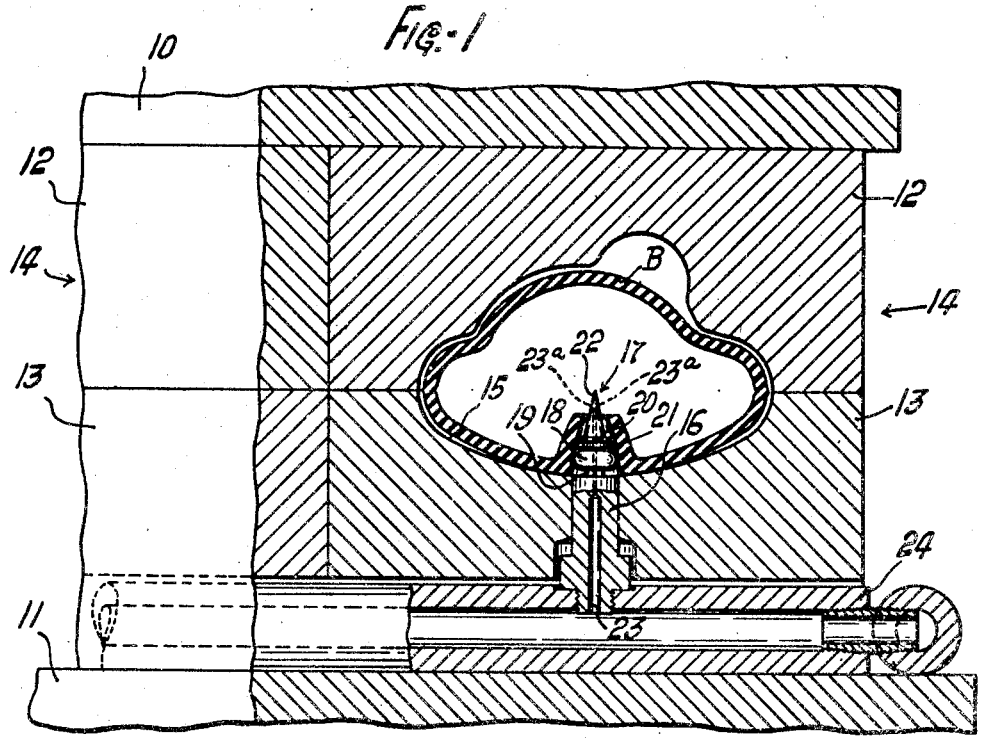
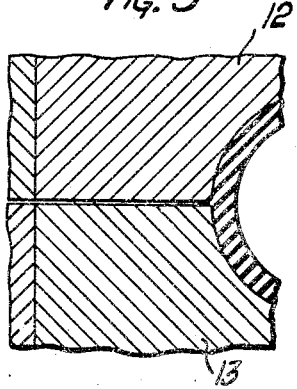
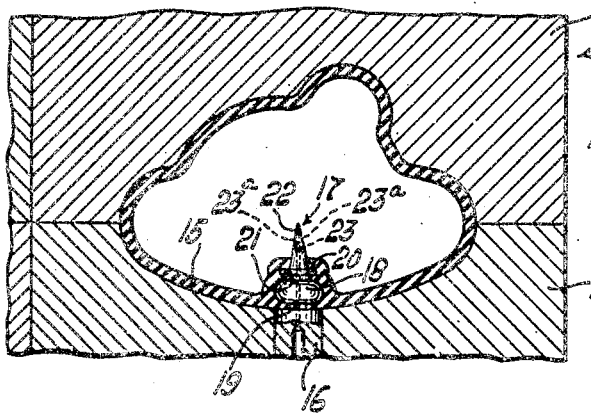
INVENTOR.
David C. Kempthorn
BY
William C. Cleland Patented Aug. 6, 1946

2,405,149

UNITED STATES PATENT OFFICE 2,405,149

HOLLOW RUBBER ARTICLE AND APPARATUS FOR PRODUCING SAME

David C. Kempthorn, Akron, Ohio, assignor to The Sun Rubber Company, Barberton, Ohio, a corporation of Ohio Original application July 15, 1942, Serial No. 450,954. Divided and this application March 31, 1944, Serial No. 528,880

3 Claims. (Cl. 46—117)

This invention relates to hollow rubber or like articles, such as hollow rubber character dolls, and to apparatus and methods for producing the same.

In the past hollow rubber articles of the character described have been produced by various so-called "blowing" methods by which usually a preformed hollow "biscuit" was placed in a sectional vulcanizing mold and subjected to internal pressure to expand the wall of the biscuit against the surface of the mold cavity. The difficulty, however, has been that this internal pressure forced the rubber between the parting surfaces of the mold sections to produce a flash or rind of excess rubber, which was required to be removed by separate trimming or buffing operations.

Furthermore, dolls manufactured by such methods have usually been provided with separate noise-making devices secured in apertures formed in the articles in various ways. For the most part such noise makers have been unsatisfactory because they frequently became loose and were swallowed by children, sometimes with serious consequences.

One object of this invention is to provide a method and apparatus for vulcanizing hollow rubber or like articles, without substantial flash or rind along the parting line thereof caused by rubber flowing between the parting surfaces of the usual sectional molds.

Another object of the invention is to provide an improved hollow rubber article with a wind operated noise-maker or squawker integrally formed in the wall thereof by vulcanization of the article, and improved apparatus for forming the noise-making device to have substantially uniform noise-making propensities.

These and other objects of the invention will be manifest from the following brief description and the accompanying drawings.

This application is a division of application Serial Number 450,954, filed July 15, 1942.

Of the accompanying drawings:

Figure 1 is a fragmentary view of a vulcanizing press, partly broken away, illustrating a cross-section through a rubber doll mold, prior to a vulcanizing cycle.

Figure 2 is a similar cross-section through a doll mold, but after vulcanization.

Figure 3 is an enlarged fragmentary cross-section at the parting line between the mold sections.

Figure 4:
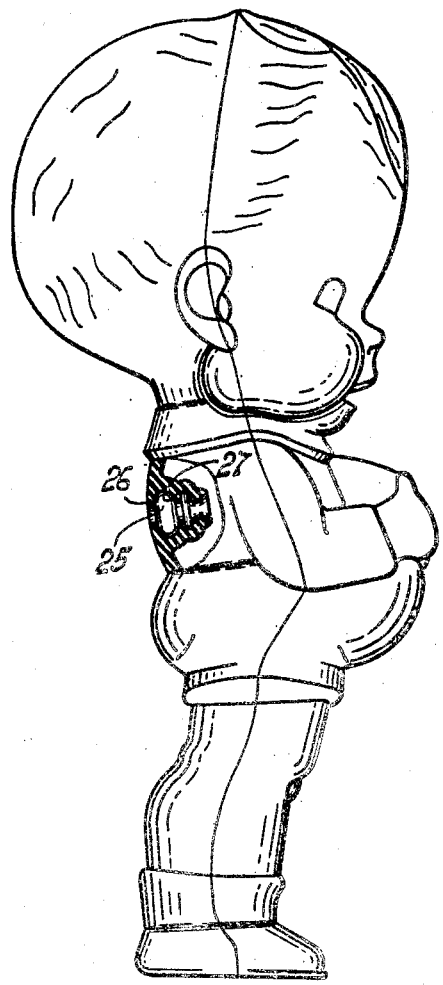
Figure 4 is a side elevation of a hollow rubber character doll, manufactured in accordance with the invention, partly broken away and in section through the integral noise-making device.

Referring particularly to Figures 1, 2 and 3 of the drawings, the numerals 10 and 11 designate upper and lower platens of a vulcanizing press of known type in which the platens are relatively movable toward and from each other. Mounted on the platens 10 and 11 are upper and lower mold sections 12, 12 and 13, 13, respectively, of a plurality of cavity molds 14, 14, the mold sections being adapted to register for vulcanizing articles in the molds when the press is closed. The contour of the parting surface of molds 14 conform generally to the outline of the articles produced therein, and the normal clearance between said surfaces is utilized for venting the mold cavities, as will be understood by those skilled in the art.

Secured in a recess 15 in the lower mold section 11 of each mold 14 is a plug 16 having its inner surface substantially flush with the inner surface of the mold cavity, and projecting inwardly of the plug may be a pin or core 17 formed with an ovate or annular enlargement 18, in spaced relation to said inner surface of the cavity to provide a relatively short constricted neck portion 19. A relatively thin, annular enlargement 20 may be provided on the pins in inwardly spaced relation to ovate portion 19 to provide an annular recess 21 of suitable depth, for purposes subsequently to be described. An inner end portion 22 of the pin 17 is tapered inwardly to a point for piercing articles formed in the mold in a manner which will also be described later.

Extending through the plug 16 and pin 17 is a passage 23 which communicates, through apertures 23ª, 23ª at the inner end of the pin, with the interior of the mold 14, the outer end of the plug 16 being threaded into a conduit 24 connected with a suitable source of supply (not shown) from which pressure fluid, such as steam, compressed air, hot water, etc., may be supplied to the interior of the mold cavity through said passage 23 to form an article in the mold under the influence of vulcanizing heat. The same connections may be similarly utilized to apply suction within the mold, or within an article in the mold to vent the same. The other molds in the press are similarly connected to the supply conduit 24.

In the operation of the apparatus, while the press is open hollow "biscuits" or casings B, roughly preformed from sheets of unvulcanized rubber in a known manner, are placed in the cavities of the lower mold sections, whereby the pin being hot from previous vulcanizing operations will pierce the lower wall portions of the biscuit and said wall portions will drape around the pin 17 including the enlarged portions 18 and 20 thereof, substantially as illustrated in the lower part of Figure 1. The length of pin 17 is such that the draped portions of the walls of the biscuits will not close the apertures 23ª from the passages 23. Upon placing the biscuits in the lower mold sections the press is operated to move the upper and lower mold sections into closed registering relation (see Figure 1).

In this closed position of the press, while the molds are maintained at vulcanizing temperature by suitable means (not shown), pressure fluid is supplied from the source of supply through conduit 23 to expand the walls of biscuits B against the surfaces of the mold cavities and thereby form the articles, as illustrated in Figure 2. It has been the practice in the past to apply substantially full vulcanizing pressure to the interior of the biscuit upon closing the press, whereby the heat of the mold caused the rubber to soften immediately and flow under the internal pressure into the spaces between the parting surfaces of the mold sections, thereby forming considerable excess rubber known as "flash" or "rind" which was required to be removed by a separate trimming or buffing operation after vulcanization. In accordance with the present invention the initial pressure supplied to the interior of the biscuits may be relatively low, say approximately ten pounds per square inch, whereby the walls of the biscuits B are expanded against the mold cavities with insufficient pressure to force the rubber between the parting surfaces of the mold sections to a material degree, this low pressure being maintained a sufficient length of time, as for example about 1½ minutes, according to temperature conditions, to permit the heated molds to form a skin coat on the articles being formed from the biscuits, after which full vulcanizing pressure may be supplied through conduit 24 for the completion of the curing cycle. The skin coating or hardened outer surfaces formed on the articles, particularly along the parting lines thereof, will prevent substantial penetration of the rubber between the parting surfaces of the mold sections when full pressure is applied, thereby obviating the usual necessity of trimming excess or flash rubber at the parting line of the completed articles, and substantially reducing the labor usually required to remove such excess.

Application of vulcanizing pressure within each biscuit B together with the heat of vulcanization, to form an article, as described above, will cause rubber of the wall of the biscuit to flow about the pin 17, substantially as shown in Figure 2, thereby forming a noise-making device integral with the wall of the finished article (see Figure 4). A chamber 25 is provided in the device by the enlargement 18 of pin 17, and spaced outer and inner, centrally apertured, walls or diaphragms 26 and 27 of the chamber are provided by rubber forming around the constricted portion 19 and the reduced portion or annular groove 21, respectively. A certain amount of excess rubber may flow inwardly over the annular enlargement 20 to form a second chamber, but even though there should not be sufficient rubber to form a uniformly shaped inner portion of the device, the arrangement may be such that there will always be sufficient rubber to form the inner diaphragm 27 in a uniform manner, whereby the noise-making propensities of articles produced as described in the molds 14 will be substantially uniform. When the vulcanizing cycle is completed fluid pressure to the interior of the articles formed in the molds may be cut off and suction applied, through conduit 24 and the passage 23, to vent the article, thereby to permit the vulcanizing press to be opened immediately at the end of the curing cycle for removal of the articles.

An article produced as described above is shown in Figure 4. Depressing a portion of this article and then releasing the same will cause a rush of air through chamber 25, thereby creating a squawking or whistling sound.

Modifications of the invention may be resorted to without departing from the spirit thereof or the scope of the appended claims.

What is claimed is:

1. A hollow vulcanized rubber article having a noise-making device integrally formed in the wall thereof by flow of rubber during vulcanization of the article, said device having therein an outer noise-making cavity defining an outer wall, a second cavity being provided in said device in spaced relation to said outer cavity and defining an inner wall in spaced relation to said outer wall, said spaced outer and inner walls having therethrough substantially aligned apertures, said inner cavity opening inwardly of the article to provide for passage of air through said aligned apertures and said outer cavity, said inner cavity defining a peripheral reinforcing portion inwardly of said inner wall.

2. A noise-making device of the character described comprising a one-piece part of rubber or like moldable material, an outer noise-making cavity provided in said part defining an outer wall, a second cavity spaced relatively inwardly of said outer cavity defining an inner wall in spaced relation to said outer wall, said spaced outer and inner walls having therethrough substantially aligned apertures, said inner cavity opening relatively inwardly to provide for passage of air through said aligned apertures and said outer cavity, said inner cavity defining a peripheral reinforcing portion inwardly of said inner wall.

3. A hollow article having a noise-making device incorporated in the wall thereof, said device comprising a body portion formed with inwardly spaced chambers therein defining walls at opposite sides of the outer chamber, said inner chamber opening inwardly of the article and said walls being apertured to provide for passage of air inwardly and outwardly of the article through said chambers.

DAVID C. KEMPTHORN.